(No Model.)
W. H. ROGERS.
FENCE POST.
No. 429,547. Patented June 3, 1890.
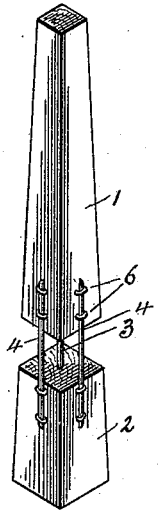
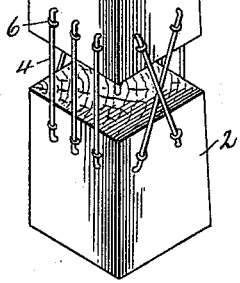
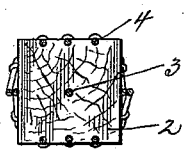
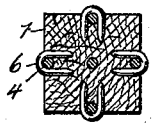
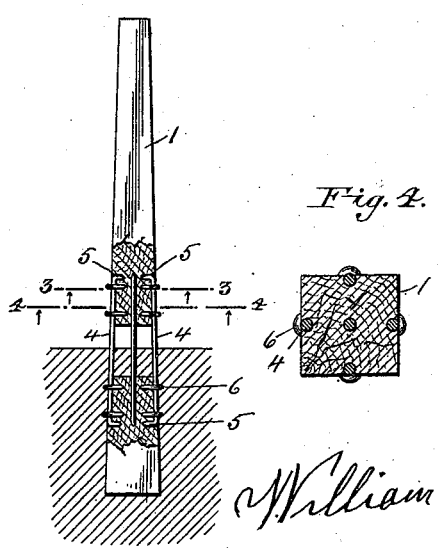
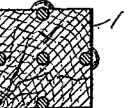
WITNESSES:
INVENTOR
BY
ATTORNEY

UNITED STATES PATENT OFFICE.

WILLIAM H. ROGERS, OF WHITMORE, OHIO.

FENCE-POST.

SPECIFICATION forming part of Letters Patent No. 429,547, dated June 3, 1890.

Application filed July 25, 1889. Serial No. 318,661. (No model.)

*To all whom it may concern:*

Be it known that I, WILLIAM H. ROGERS, a citizen of the United States, residing at Whitmore, in the county of Sandusky and State of Ohio, have invented certain new and useful Improvements in Posts for Fences and the Like; and I do hereby declare the following to be a full, clear, and exact description of the invention, such as will enable others skilled in the art to which it appertains to make and use the same.

My invention relates to certain new and useful improvements in fence-posts, and is designed to furnish a device of that character which, while firmly held or anchored in the ground, shall be protected at its base against the effects of decay and consequent disintegration.

In carrying out my invention I have devised the construction of parts illustrated in the accompanying drawings, wherein—

Figure 1 represents my improved fence-post in perspective. Fig. 2 represents the same in elevation and partial section and in position for use. Fig. 3 represents a transverse section taken on a plane represented by the line 3 3 of Fig. 2, and Fig. 4 represents a transverse section taken on a plane represented by the line 4 4 of Fig. 2. Figs. 5 and 6 represent in perspective a modification.

Similar numerals of reference indicate similar parts throughout the several views.

Referring to the drawings, it will be noted that my improved fence-post consists of a main body portion 1, which may be of any convenient form suitable for the attachment of the side boards or barb-wire, and a base portion 2, adapted to be embedded in the ground below the level of the soil, so as to be entirely buried in and surrounded by the same. This base-piece I construct preferably of the shape illustrated in the drawings, which I find to be especially adapted to maintain an upright position. The tapering sides of the base-piece enable the ground to be tamped or pressed firmly down upon them and lessen the danger of dislodging or uprooting the base-piece, for the reason that it is broader at the bottom than at the top.

Connection between the main body portion of the fence-post and the base-piece is made primarily by means of the central connecting-rod 3, of metal, embedded in each, as shown. On each side I also arrange auxiliary connections 4, also of metal, said side connections consisting of rods provided at their opposite ends with re-entering hooks 5, adapted to be driven into the two parts of the fence-post and to be secured in place by means of staples 6. I make a portion of these connecting-rods to cross or intersect each other, as shown in Fig. 1, which serves to strengthen and give rigidity to the connection.

It will be noted that by reason of these connecting-pieces the main body portion of the fence-post is supported at such a distance from the ground that it will not be subjected to contact with the soil, while at the same time the base-piece is buried, so as to be out of contact with the atmosphere. By this arrangement I not only secure a firm anchorage for the fence-post, but protect the post at that portion which is at the level of the ground, the connecting metallic rods alone being on that level. I find this of great advantage, for the reason that the connecting-pieces are not materially affected by the combined action of the soil and atmosphere at this point, whereas experience has demonstrated that fence-posts of wood alone rot or decay most rapidly at their point of juncture with the soil.

The connecting metallic pieces I construct of galvanized iron, which is not affected by moisture. The part embedded in the ground or the base-piece is made of hard wood, while the main body portion may be made of soft wood, thereby lessening the cost of the post, while at the same time securing a post practically as durable as the ordinary split oak or cedar.

The number of the connecting-pieces can be varied as desired, and the thickness thereof varied according to the strength it is desired to impart to the post. It will be evident that in this manner I can construct posts ranging in size from a grape-vine post to a telegraph-pole.

For very heavy posts I prefer the construction illustrated in Figs. 5 and 6, wherein I multiply the connecting-pieces on all sides and arrange some of them to intersect each other, as shown.

Having thus described my invention, what I claim is—

1. A fence-post consisting of a main body portion 1, a base-piece 2, adapted to be embedded in the soil, a central connecting-rod 3, and connecting-rods 4 on opposite sides, having re-entering hooks 5 and staples 6, the main body portion and the base-piece being separated from each other by an intervening space, substantially as described.

2. A fence-post consisting of a main body portion, a base-piece adapted to be embedded in the soil, a central connection-rod, and side conecting-rods between the main body portion and base-piece, said rods separating the two by an intervening space and a portion of said connecting-rods crossing or intersecting each other, substantially as described.

In testimony whereof I affix my signature in presence of two witnesses.

WM. H. ROGERS.

Witnesses:
MAMIE QUILTER,
FRANCIS O'FOORELL.